Dec. 11, 1962  F. A. SCHWERTZ  3,068,481
PROCESS AND APPARATUS FOR TESIPRINTING
Filed July 1, 1960  5 Sheets-Sheet 1
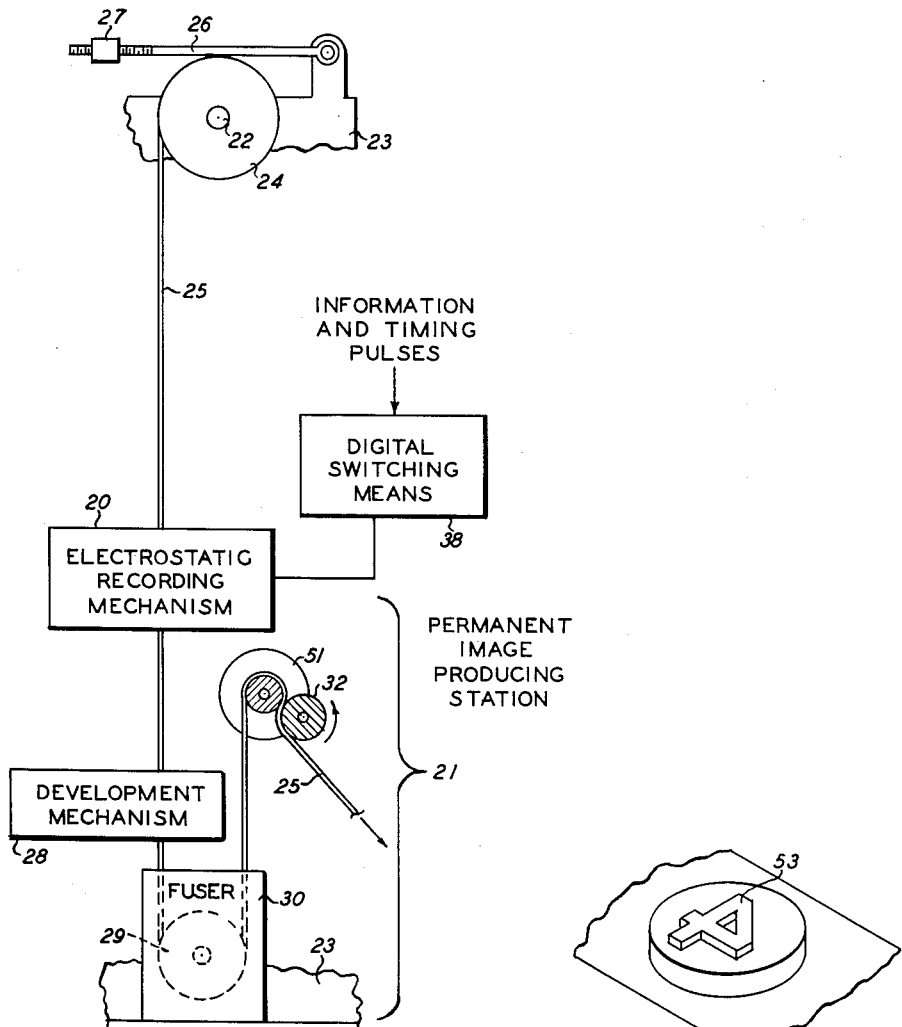
FIG. 1
FIG. 4
INVENTOR.
FREDERICK A. SCHWERTZ
BY
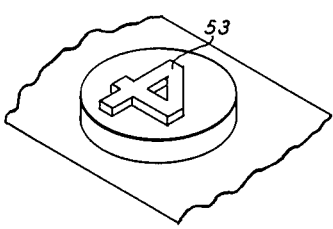
ATTORNEY Dec. 11, 1962    F. A. SCHWERTZ    3,068,481
PROCESS AND APPARATUS FOR TESIPRINTING
Filed July 1, 1960    5 Sheets-Sheet 2

INVENTOR.
FREDERICK A. SCHWERTZ
BY
George W. F. Simmons
ATTORNEY

Dec. 11, 1962    F. A. SCHWERTZ    3,068,481
PROCESS AND APPARATUS FOR TESIPRINTING
Filed July 1, 1960    5 Sheets-Sheet 3
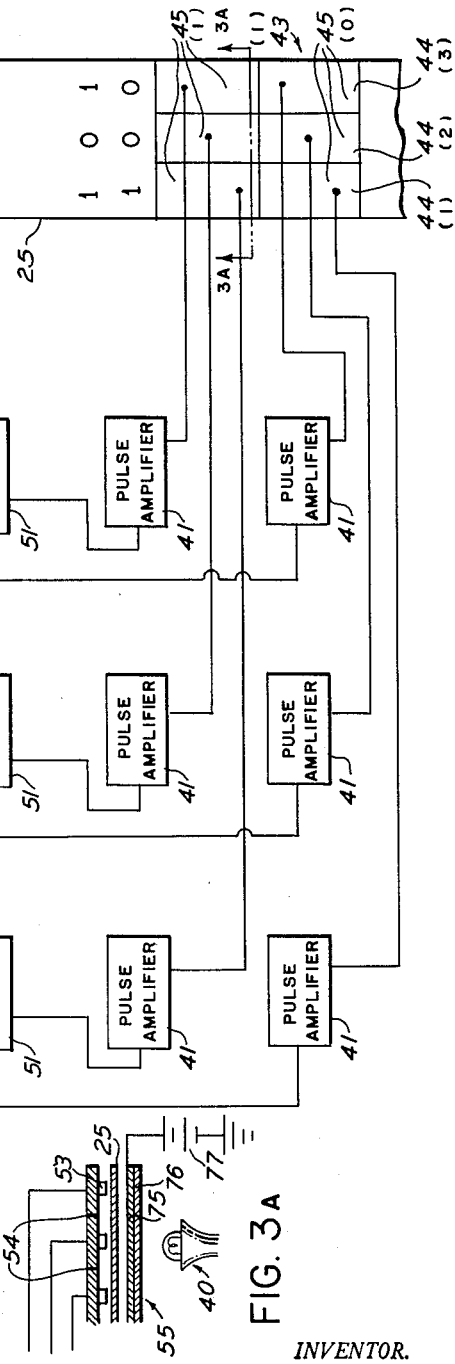
INVENTOR.
FREDERICK A. SCHWERTZ
BY
George W. F. Simmons
ATTORNEY Dec. 11, 1962   F. A. SCHWERTZ   3,068,481
PROCESS AND APPARATUS FOR TESIPRINTING
Filed July 1, 1960   5 Sheets-Sheet 4

INVENTOR.
FREDERICK A. SCHWERTZ
BY
George W. F. Simmons
ATTORNEY

United States Patent Office 3,068,481
Patented Dec. 11, 1962

3,068,481
PROCESS AND APPARATUS FOR TESIPRINTING
Frederick A. Schwertz, Pittsford, N.Y., assignor to Xerox
Corporation, a corporation of New York
Filed July 1, 1960, Ser. No. 40,372
13 Claims. (Cl. 346—74)

This invention relates to electrostatic recording and reproduction of images.

In recent years there have been developed various types of electronic machines such as digital computers, accounting and tabulating machines, Teletype machines and the like which produce information at high rates of speed. Ordinary mechanical recording devices are too slow and too cumbersome to handle the outputs involved at the operational speeds of these devices. Accordingly, there have come into being techniques and devices to record as electrostatic images the information developed by these high speed devices. The electrostatic images are made visible by developing with powdered or inked materials and the visible image is generally fused or dried to make the output information permanent.

This class of read-out device has developed in a number of different forms and generally the choice of which form will be employed is dependent upon the type of output information to be recorded and the rate of speed of transmission desired. The choice also may depend upon the type of input to be employed as well as the type of information to be reproduced at the output point.

These various known systems in general involve positioning a recording web, generally of insulating material, at a slight distance from one of a number of possible recording heads. An electric bias pulse is then applied between the recording web and generally through tne recording web to result in the deposition of an electrostatic charge pattern on the recording web. The web is then generally moved to a new point and developed, thus making the charge pattern visible and the information available for use.

In a dynamic system with rapid relative movement between printing web and the character-forming electrodes using pulses of a few microseconds' duration, it has been difficult to obtain the high degree of reliability essential in handling computer output. Moreover, it has been found that the pulse efficiency and the voltage latitude for effective printing under practical operating conditions were often reliatively critical.

Now in accordance with this invention it has been found that there is a substantial improvement in reliability of printing if the printing gap between the recording web and the electrode spaced therefrom is irradiated with ultraviolet radiation. There has also been noted greatly increased voltage latitude and pulse efficiency.

It is therefore an object of the present invention to provide improved electrostatic recording techniques and apparatus.

It is a further object of this invention to improve high speed recording devices of the read-out type.

For a better understanding of the invention as well as other objects and further features thereof, reference is had to the following detailed description thereof to be read in conjunction with the accompanying drawings, wherein:

FIG. 1 is a schematic diagram showing an embodiment of an electrostatic recording system;

FIGS. 3 and 3a are schematic diagrams showing another electrostatic recording mechanism of a device such as that illustrated in FIG. 1 as well as associated circuits for recording information in the form of alphabetical and numerical symbols;

FIG. 4 shows in detail an embodiment of a character of a recording electrode of FIGS. 2 and 3;

Figure 2:
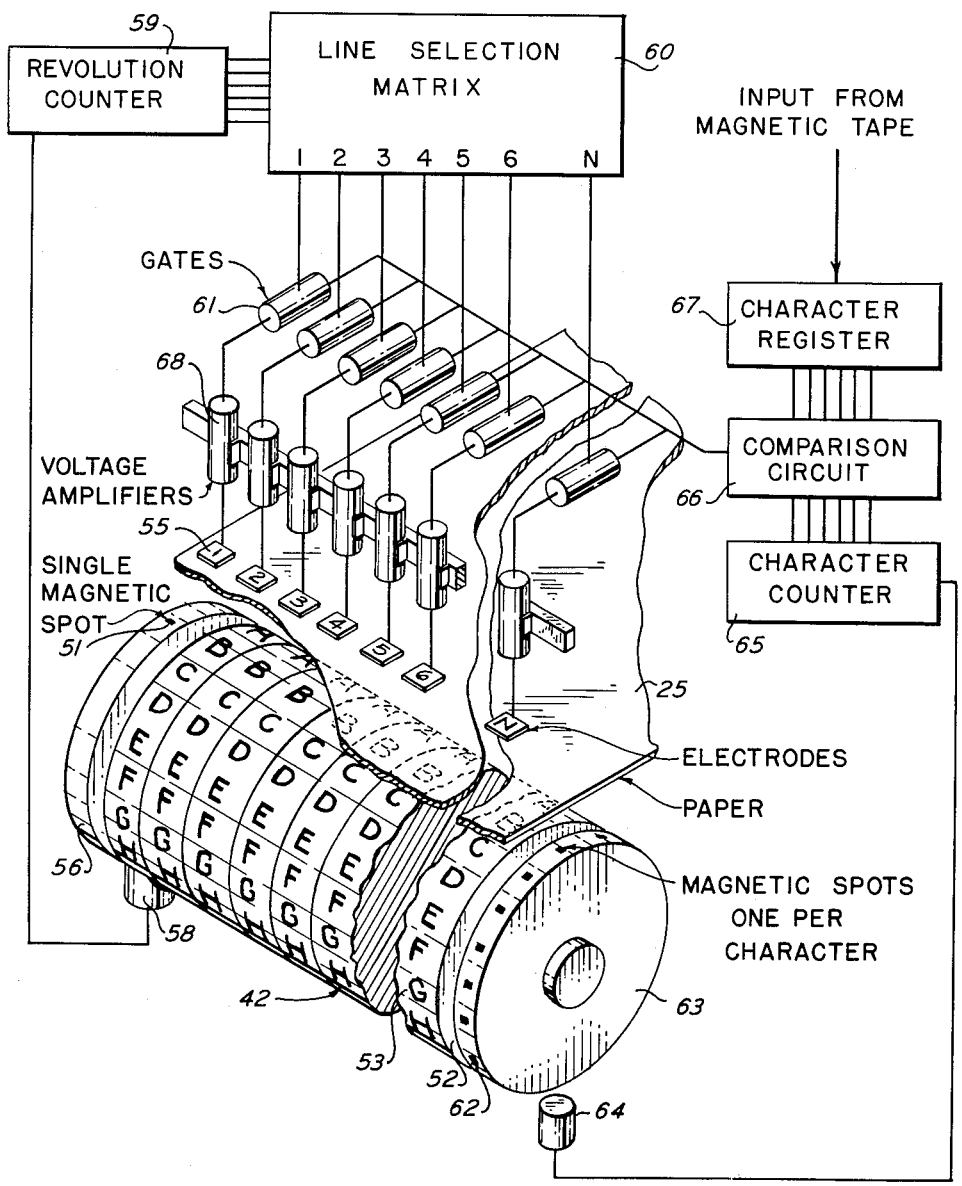
FIG. 2 is a schematic diagram showing an embodiment of electrostatic recording mechanism of a device such as that illustrated in FIG. 1 as well as associated circuits for recording information in the form of alphabetical and numerical symbols.

Referring now to the drawings, and more particularly to FIG. 1, the electrostatic recording device comprises a suitable framework 23 and may consist of a pair of vertical side plates with rods and support means between them on which the working parts are mounted. The main components of the working parts are an electrostatic recording mechanism 20 and a permanent image producing station 21. A single 22 at the top of the framework 23 carries a supply roll 24 of recording web material which is fed from the roll as a continuous web 25 and drawn downwardly into the recording and image producing stations 20 and 21.

A controlled tension is applied to the web by a sliding plate 26 which rests on top of roll 24 and whose pressure may be varied by adjusting the longitudinal position of the level weight 27. The web, after traveling through the recording stage 20, goes through the development mechanism 28 of image producing station 21 and passes under the drum 29 to a fuser 30. The web thereafter goes up and around web advance roller 31 and out between this roller and idler roller 32.

As the web leaves supply roll 24 it enters the recording mechanism 20 wherein triggering voltages derived from a digital switching system 38 are applied between suitably shaped electrodes to effect a field discharge causing a charge transfer thereby forming an electrostatic latent image on the web. The operation and structure of the recording mechanism will be described in greater detail in connection with subsequent figures.

As the web proceeds downward from the recording stage 20, it passes through the development mechanism 28 wherein the invisible electrostatic images are rendered visible by depositing thereon a finely-divided material such as an ink mist or an electroscopic pigmented powder which adheres to the electrostatically charged image areas. To promote development, the particles are preferably charged positively (in the case of a negative image area) by triboelectric charging or other means. A suitable powder development mechanism, for example, is shown in copending application Serial No. 687,669, now Patent No. 3,015,304, issued Jan. 2, 1962, filed on October 2, 1957, by Carlson and Bogdonoff and other forms are shown and described in Carlson Patent 2,357,809 and in Walkup and Fauser Patent 2,573,881, and a mechanism for developing electrostatic images with an ink mist is disclosed in Carlson Patent 2,551,582.

After leaving the development mechanism and entering the fuser 30, the resin powder images are heated in a suitable oven to a temperature sufficient to fuse the resin. If liquid ink development is used, the fuser may serve merely as a heated drier for the ink. With webs formed of plastic materials, which tend to distort when heated, it is preferred that the fuser consist of a chamber filled with air saturated with vapor or solvent for the resin images and not for the web material. Solvent is absorbed by the powder until it becomes tacky or semi-fluid and as the web leaves the fuser the solvent evaporates leaving a fused image on the web. With coated paper the solvent for the plastic may be used in which case it is possible to use infusible electroscopic powders as they become imbedded in the plastic or wax coating which is softened by heat or solvent as it passes through the fuser. A suitable vapor fuser is disclosed in Carlson Patent 2,776,907.

Instead of fusing the powder images on the original web, it is possible to transfer the images to another sheet or surface by an electrostatic transfer method such as is shown in Schaffert Patent 2,576,047 or by rolling against an adhesive coated surface. Thus, the resin images can be transferred and affixed to paper off-set mats for use in off-set printing or multiple copies. It is to be understood that means for development and printing of electrostatic images forms no part of the present invention and any known means may be used for this purpose.

Referring now to FIG. 2, the electrode structure of the recording mechanism 20 and the digital switching circuit 38 for applying pulses thereto is shown in greater detail. The recording device includes a cylindrical drum 42 rotatably mounted and driven at a constant angular velocity. Circumferentially disposed at equi-spaced points about the drum are several groups of raised characters 53 of conductive material, each group constituting a ring. One ring of characters is provided for each column of recording and the cylinder extends generally across the printed page. The characters in each ring thereof are composed, for example, of the symbols A to Z and 0 to 9 so that both alphabetical and numerical information can be selectively recorded.

An insulating web 25 is arranged to pass tangentially to the rotating character drum. Opposite the web is transversely disposed an array of stationary electrodes 55, one for each ring of characters. In operation, when a selected character passes under a chosen electrode, the electrode is subject to a triggering pulse as disclosed, for example, in copending application Ser. No. 623,327 now abandoned, filed by F. A. Schwertz on November 20, 1956. The triggering pulse acts to raise the stress above the critical value to produce a field discharge between the character and the web and thereby form a charge pattern having the shape of the selected character. Alternatively, the triggering pulse may be applied to the character drum as disclosed, for example, in copending application Ser. No. 664,137, filed by F. A. Schwertz on June 6, 1957, now Patent No. 2,919,967, issued January 5, 1960.

A manner of sequentially selecting the proper character ring and the particular character therein may involve the use of digital computer techniques as illustrated in this figure. For this purpose, mounted on the left hand side of the character drum 52 and rotating therewith is a disc 56 containing a single magnetic mark 51. A magnetic recording head 58, disposed adjacent the disc, picks up a pulse for each revolution of the drum, which pulse is instantly transmitted to a revolution counter 59.

For each position of the revolution counter 59 one and only one of the lines marked 1 to N on a line selection matrix 60 is energized, the remaining lines being held at ground potential. The energized line, however, must not activate the selective electrode until the chosen character is immediately in line with the electrode. The energized line is therefore connected to a gate 61 which is rendered operative only when subjected to the action of two energizing signals.

The second signal or energized line activates the gate only when the selected character is in line with the selected electrode. This is accomplished as follows: Magnetic marks 62 are imbedded at circumferentially-spaced positions on the disc 63 attached to the right side of the drum, there being a magnetic mark for each character in the ring. These marks, which are aligned with the characters, are sensed by a magnetic head 64 disposed below disc 63 and transmitted to a character counter 65. The generation of the counting and shift pulses effected by discs 56 and 63 may also be accomplished mechanically by toothed discs actuating suitable switches or other means known and conventionally used in the art.

The number in the character count is compared in a comparison circuit 66 with the number inserted in a character register 67 by any suitable source of input digits, such as a magnetic tape system. When these two numbers agree, an output pulse is emitted by the comparison circuit 66. At the moment line 5, for example, is activated by a pulse from comparison circuit 66, the gate 61 under line 5 will transmit a pulse through a voltage amplifier 68 to the fifth electrode 55 thus producing a charge pattern corresponding to the selected image. After all the character images are formed, the charge patterns may be developed and fused by the usual method.

In the structure shown, in order to print each full line across the web, the character drum must complete as many revolutions as there are columns to be printed. If the angular velocity of the drum is made very high relative to the velocity of the web, the printed line will be substantially straight across. However, to compensate for any slanting or skewing which may occur in the printing, the drum may be placed at a slight angle relative to the paper or the rings may be displaced relative to each other. One such skewed arrangement is shown described in U.S. Patent 2,776,618, to Hartley.

As another alternative applicable for some read-out devices an electrode assembly may be employed with a suitable line storage memory device to produce line-by-line printing in which case skewing is unnecessary and a much higher printing speed can be achieved. A device for achieving this is shown in co-pending aplication Ser. No. 623,327, now abandoned, filed November 20, 1956, by Frederick A. Schwertz, and its teaching is incorporated herein by reference.

It should also be appreciated that for some applications a single wheel or modifications from a single rotating disc might de desirable and for further disclosure in connection with circuitry and printing in connection with such a device, the teachings of co-pending application Ser. No. 532,534, filed September 6, 1955, by Chester F. Carlson, are incorporated herein by reference.

In practice the drum has been rotated at 12,000 revolutions per minute and generally a D.C. bias voltage is applied to the backing electrode in respect to the character drum. This bias voltage is to apply part of the potential necessary for breakdown but an insufficient amount of potential to break down the gap. This simplifies the pulse requirements for image formation. In effect, if the threshold point is 600 volts and 550 volts are applied as a bias potential, then only about a 50 volt pulse is necessary to break down the gap. In practice 700 to 900 volts more than the breakdown voltage would be used for image formation. Thus, in the example given, a pulse of about 850 volts would be applied in order to print. The web speed which is generally preferred is about 60 inches per minute but also it is preferred that variable speeds be provided for so that the web may be moved, for example, between about 30 to 90 inches per minute. With the drum rotating at high rates of speed, ionization and image formation must take place in a very short time to prevent blurring or smearing of the formed charge pattern. With a gap of about 4 to 5 mils between the web and the backing electrode with a drum rotating at about 12,000 revolutions per minute and using a web material of cellulose acetate butyrate-coated paper having a total thickness of about 3 mils, a pulse of about 600 to 900 volts for about 3 microseconds' duration including a bias anywhere from 600 to 1100 volts and a pulse width of between about 2 to 50 microseconds, and preferably between about 2 to 10 microseconds, has produced extremely high quality images. The drum which was used was an aluminum drum with rings of steel characters.

Various gaps have been included between the printing electrode and the web material. With air in the gap and a gap of about 4 or 5 mils and a pulse amplitude of about 900 volts has been found optimum for highest quality printing. It has also been found that an increase or decrease in gap requires a commensurate increase or decrease in voltage of about 160 volts per mil change. Generally, however, it is preferred to operate above about 3 mils of air gap. Typically, when employing a gap of 3 mils or less, images including halos are formed and partial rather than complete characters frequently form. As the gap increases above about 10 mils image resolution as well as image contrast decreases in quality rapidly. Within the desired gap spacings, image quality may be further improved by employing quantities of an electronegative gas in the gap as disclosed in U.S. 2,919,171.

Figure 8A:
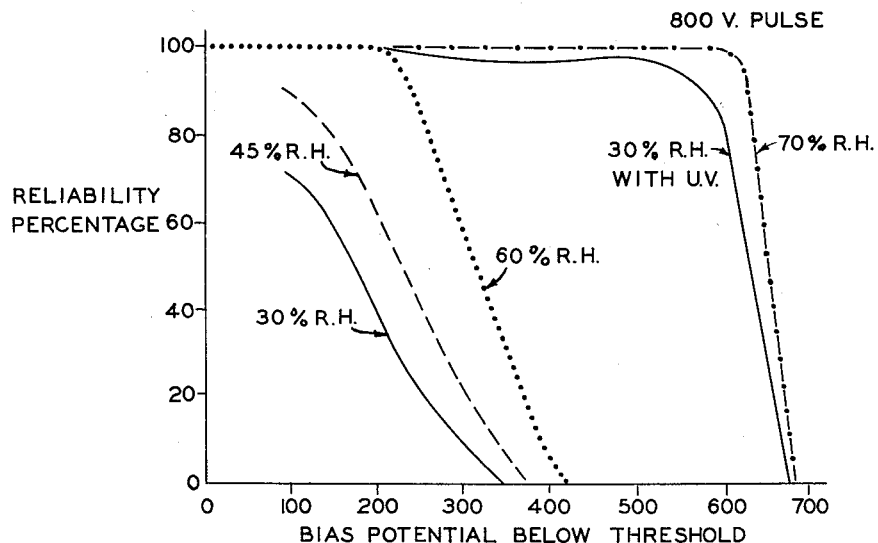
FIGS. 8a and 8b are graphs illustrating the improvement in printing electrostatic images at low humidity using the instant invention.
Figure 8B:
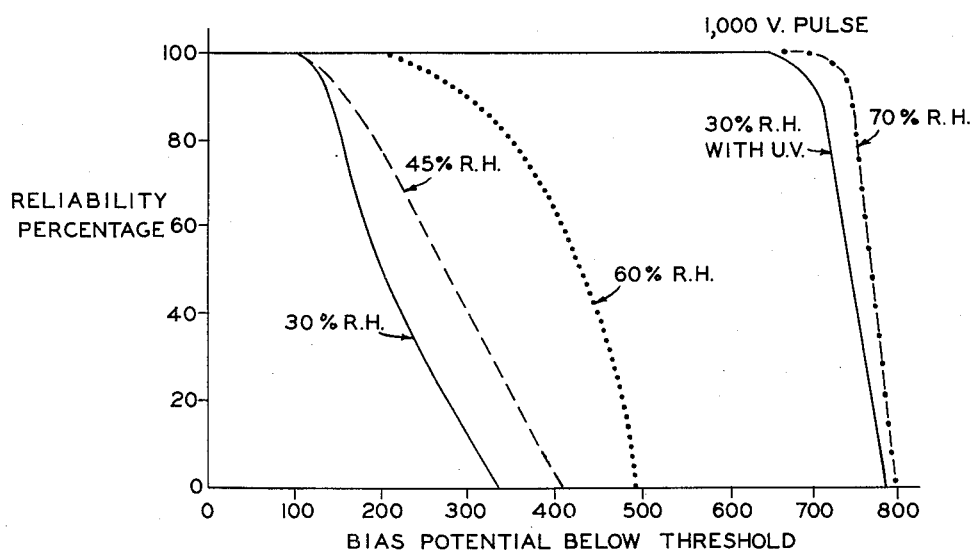

Both the voltage latitude and the reliability of operation of an electrostatic printing machine have proven to be highly dependent on the relative humidity at which the system is operated. This is graphically illustrated in FIGS. 8a and 8b which plot reliability of operation against the bias potential below threshold for a given voltage pulse. The bias potential refers to a D.C. potential applied between the backing electrode and character electrode. The threshold potential is that bias potential where electrostatic discharge occurs across the printing gap. Thus, a bias potential below threshold of 200, means that an increase in the bias potential of 200 volts will cause a discharge across the gap. Reliability refers to the percentage of times that an electrostatic image discharge occurs across the gap when a given pulse is applied. As can be seen using a printing pulse of 800 volts, 100% reliability is obtained at about 70% relative humidity. When the relative humidity drops to only 60%, however, 100% reliability can only be obtained when the bias potential is about 250 volts below threshold. That means that the pulse must be at least 550 volts above the threshold potential for complete reliability. If the relative humidity drops to 45% or less, 100% reliability cannot be obtained with a voltage pulse of 800 volts. On increasing the pulse to 1000 volts, as shown in 8b, 100% reliability can be obtained down to 30% relative humidity if the bias potential is maintained at only about 100 volts below threshold.

It has now been found that when the gap is irradiated with ultraviolet radiation, these figures are drastically changed. An apparatus for accomplishing this is shown schematically in FIG. 7. As there shown, an ultraviolet lamp 40 is so placed as to irradiate the gap between the character drum 42 and the backing electrode 55. In this particular instance the lamp used was a Hanovia lamp obtained from Engelhardt Industries, Inc., type 30,600 and being a 100 watt high pressure lamp with a quartz envelope. The effect of the ultraviolet radiation gave astounding results both in terms of reliability, voltage latitude and pulse efficiency. Thus, using the 800 volt pulse as shown in FIG. 8a gave almost complete reliability even at 30% relative humidity. In practice, only one miss in 400 times was obtained under these conditions. This deviation from compelte reliability is exaggerated on the graph as the scale is not adequate to record this slight difference. On increasing the pulse to 1,000 volts as shown in 8b, there was obtained complete reliability, even down to 30% humidity. Without the use of ultraviolet in the gap the apparatus had an operating latitude of only 100 or 200 volts of bias potential, that is, when the bias was reduced to a potential 200 volts below threshold most of the attempts to form a character failed. Upon irradiating the gap with ultraviolet voltage latitude was extended to 700 volts. Under gap and relative humidity conditions wherein a miss-free latitude 300 volts was obtained without ultroviolet upon irradiating the gap with ultraviolet the latitude increased to 600 volts. Thus, the effect of ultraviolet is not only to improve reliability drastically, but also to substantially increase the latitude.

Figure 7:
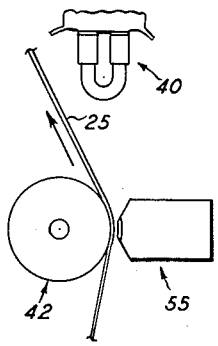
FIG. 7 is a schematic diagram of electrostatic recording mechanism as illustrated in FIGS. 1 and 2 showing one embodiment of the invention.

While FIG. 7 shows the ultraviolet lamp placed opposite from the gap, its precise position is not critical so long as the gap is fully irradiated with ultraviolet. Thus, a screen electrode (as of Lectromesh) may be used for the backing electrode 55 opposite the character electrodes 42 and the lamp positioned behind the screen to directly flood the gap. Other variations in the placement of the source of ultraviolet will be apparent to those skilled in the art. It is believed that the ultraviolet radiation strikes the metal backing either directly or upon reflection from the printing web 25.

The exact mechanism of operation is not clearly understood but is believed to be as follows:

High speed electrostatic printing utilizes pulses of the order of a few microseconds. The chance of an ion or electron being in the printing gap within the duration of any printing pulse is very slight. Thus discharge is dependent on field emission of electrons to initiate ionization. This difficulty of forming the initial ions or electrons explains the poor reliability under low humidity conditions. Utilizing ultraviolet radiation having a sufficiently short wave length such that its energy is equal or greater than the work function of one of the materials present in the printing gap, that is, the backing electrode, the printing electrode or the image receiving material itself causes electrons to be emitted into the gap continuously thus assuring that a number of free electrons must be available during every pulse even of a few microsecond's duration. If two electrons are separated per microsecond by the ultraviolet radiation, the corresponding current would be about ⅓ of a micro-microampere. Experiments have shown, utilizing apparatus similar to that shown in FIG. 7 without the paper in the gap, that the current obtained while irradiating the gap with ultraviolet as shown is about three micro-microamperes. While this current is infinitesimally small, it is also extremely critical and important to reliable operation.

FIGS. 3 and 3a show another electrostatic recording device utilizing an alphanumeric character shaped electrode as in FIG. 2. However, in the device illustrated, the electrode structure does not move but stay stationary while only the web 25 is moved. In the device shown the web 25 is moved past the printing elements 43 in the direction of the columns 44(1), 44(2) and 44(3) while signals corresponding to the printing elements of any given row 45(0) and 45(1) are stored for a length of time equal to that required for a point on the web to come opposite that particular row whereupon an electrode is actuated so as to print the electrode symbol on the web. The storing of the signal is accomplished by a shift register having a number of stages equal to the number of rows minus one. The apparatus pictured is a three-column device for printing binary numbers. A device for printing decimal numbers would require, for example, ten rows with nine shift registers for the first row, eight for the second and so on.

The principles of operation of the device can be adequately understood in the system shown in FIG. 3. As there shown, the computer feeds a signal to a decoder 46 which emits signals to the lines 47 depending on the value of the digit. The output lines of the decoder feed the column gates 48 in parallel. A gate pulse generator 49 successively and cyclically pulses the different column gates 48 so as to render the column gates conductive if they are supplied a signal from the decoder. A clock pulse generator 50 acting synchronously with the web feed means times the pulses of the gate pulse generator 49 and the shift registers 51. Clock pulse generator also controls the decoder so that the output pulses appear at the appropriate time for recording on the web. As the web 25 synchronously advances a space equivalent to one line, the clock pulse generator 50 pulses the shift registers 51 causing any signal stored therein to actuate the pulse amplifier 41 thereby printing out on the electrode matrix 43. As the same time the clock pulse generator 50 actuates the gate pulse generator 49 which actuates the column gate 48 to advance the next row of pulses to shift register 51. Thus, after each movement of the web 25 through one line space, a signal is supplied to the shift registers 51 and to the gate pulse generator 49 causing the signal stored in the column gates 48 and in the shift registers 51 to advance to the next unit which, in this case, will be the two series of pulse amplifiers 41 and the shift registers 51. On energization of the pulse amplifiers 41, the electrode members 43 will emit an electrostatic discharge forming on the web the alphanumeric character represented 53 onto the web 25. The resulting electrostatic image on the web 25 is processed as shown in FIG. 1. The printing side of the electrode matrix contains conductive shaped electrodes as in the device of FIG. 2, which electrodes are shown in more detail in FIG. 4 and described below. The printer contains three columns 44 numbered respectively 1, 2 and 3 and two rows 45 numbered respectively 0 and 1. All of the electrodes in one row have the same shaped character thereon, in this case 0 in the one row and 1 in the other, to print binary numbers. As many columns as desired may be added for full page printing. There must be as many rows as symbols to be printed. Each electrode is electrically insulated, as by dielectric spacers 54, from adjoining electrodes in both column and row. To illustrate the printing action of the matrix 43, there are illustrated two lines of electrostatic images on web 25 emerging from the matrix 43. It is understood, however, that visualization actually occurs on development of the electrostatic image.

Because of the great length of the printing gap in the stationary matrix printer as compared to the rotary drum printer, it is evident that the ultraviolet source 40 must be positioned in back of the backing electrode to irradiate the gap. Thus, the backing electrode 55 must either be a screen or, as shown, comprise an electrically conductive layer 75 on a support 76 both layer 75 and support 76 being substantially transparent to ultraviolet. A suitable voltage source 77 to bias the gap is also illustrated diagrammatically.

When a pulse appears at the "0" output of the decoder it passes directly through the activated column gate to the corresponding "0" pulse amplifier and is immediately recorded as an electrostatic pattern on web 25.

When, however, a pulse appears at the "1" output of the decoder it passes through the activated column gate to the corresponding shift register where it is stored. When the next clock pulse arrives at the shift register the "1" pulse is transferred to the corresponding "1" pulse amplifier and is immediately recorded as an electrostatic pattern on web 25. Thus the printing of "1" pulses is delayed with respect to the printing of "0" pulses by the clock-to-pulse interval, which is chosen to equal the time required for web 25 to travel from the "0" printing position to the "1" printing position resulting in the "0's" and "1's" printing in line.

A character forming element or face is illustrated in FIG. 4. In this embodiment character face 53 is shown as a raised type face. However, it is contemplated that in some instances the character faces may comprise conductive areas surrounded by insulated areas or lying in the same surface defining the edge of the wheel, or they may comprise areas of low work function material applied to a metal wheel of high work function material so that discharge will take place only from the image areas. In connection with this embodiment the various characters have been referred to as "alphanumeric" by which is meant a formed type or character comprising an alphabetical symbol or a numeral or the like. The characters may be of substantially any size, and if the resulting print is of characters of a small size, improved readability can be produced by xerographic enlargement or photographic enlargement or the images may be optically projected for reading.

Figure 5A:
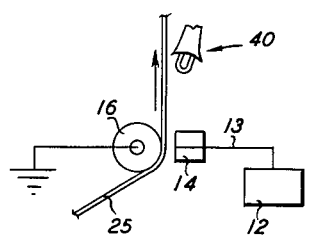
FIGS. 5 and 5a are schematic illustrations of another embodiment of electrostatic recording mechanism of a device such as that illustrated in FIG. 1 for forming alphanumeric symbols using a pin matrix.
Figure 5:
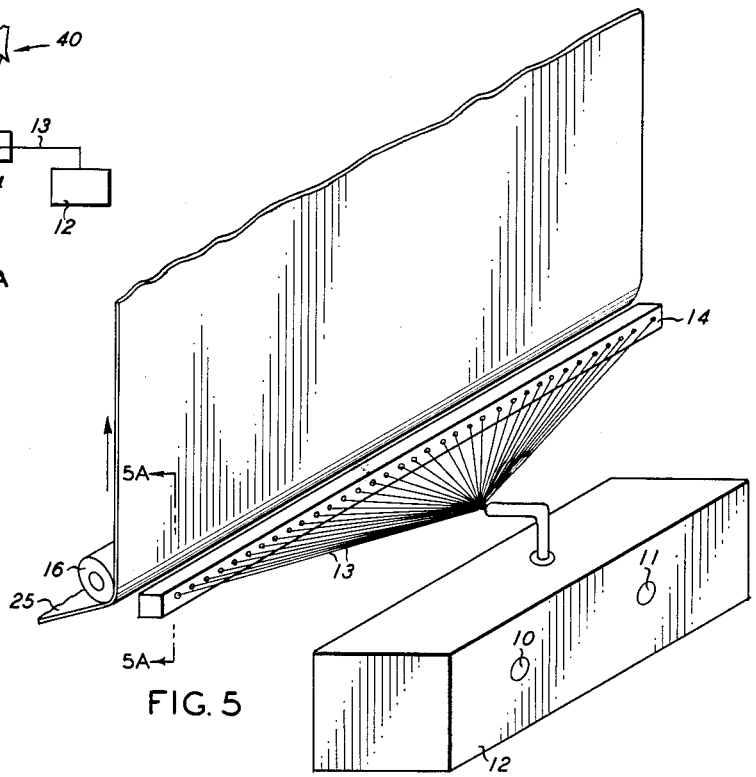

Obtaining electrostatic discharges in faithful conformity to a shaped character electrode poses special problems of grave difficulty. While the use of ultraviolet has proven particularly valuable in electrostatic printing of shaped character electrodes, its use is not limited thereto. It has also been found advantageous to employ ultraviolet radiation with pin electrodes. Electrostatic printing using pin electrodes has been described for example in U.S. 2,919,171, to Epstein et al, and in U.S. patent application Ser. No. 683,647, filed on September 12, 1957, by me and of which this application is a continuation-in-part. Apparatus corresponding to that shown in my parent application is shown in FIG. 5 herein. As there shown, the system has two electrical inputs, the information input at 11 and a time reference input at 10, both feeding the electric information analyzer indicated by numeral 12. The output of the analyzer 12 is denoted by a plurality of leads 13 individually connected to respective discharge electrodes arranged in a desired spatial array within the housing 14. The output of the analyzer 12 as transduced by the electrodes is in the form of selective and/or varying degrees of electrical discharge from the respective electrodes to a web 25 of thin insulating stock. The discharge pattern adduced by the electrodes at 14 is thus transferred or established upon the section of web 25 juxtaposed thereto as an electrostatic charge forming a corresponding electrostatic charge pattern. Web 25 is advanced in the direction of the arrows in synchronization with or at a speed related to the input of information to the analyzer to carry the established charge pattern through the development and fixing stations or equivalent means as indicated in FIG. 1. Various types of analyzers useful therein are described in detail in the aforesaid parent application and are incorporated herein. However, as they form no part of the instant invention, further description is unnecessary. A cross-section of the electrode printing station is shown in FIG. 5a together with means to irradiate the gap with ultraviolet.

Figure 6:
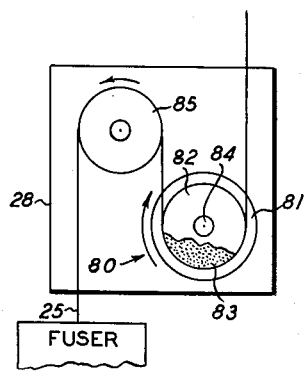
FIG. 6 is a fragmentary view illustrating one form of powder development mechanism.

Whatever type of electrostatic recording system is used, a suitable development system is illustrated in FIG. 6. As there shown, the web 25, now carrying the intelligence in electrostatic charge form, passes into the developer station 28. This device comprises a pair of rollers 80 and 85. Roller 80 includes a central bearing shaft 84 carrying a pair of axially spaced discs 82 over which the web edge peripheries pass. Flanges 81 confine the web in place on discs 82. The web and discs 82 thus form a hopper in which a supply of electroscopic powder 83 is contained. It is preferable, although not necessary, that the powder 83 be charged by triboelectric or other means to carry an electrostatic charge opposite from that established on the web by the transducing discharge electrodes 53. The powder adheres in the areas charged by electrodes 53 to produce a visible presentation of the intelligence carried by the web. As the powder 83 is tumbled over the web 25, if an initial preliminary charging of the web (as disclosed in my said parent application) were of a polarity opposite from that at the electrodes 53, then this background charge on the web would be of the same polarity as the charged powder and would assist in repelling the developer powder from this background area. After being developed, the web passes from roller 80 up over roller 85 and down into fuser 30.

The term "field discharge" as used throughout is intended to mean a field induced silent electric discharge between the character forming elements and the interposed web including an insulating layer resulting in the formation of an electrostatic charge pattern on the insulating layer corresponding to the shape of the discharge. This type of discharge is not like a spark discharge, but creates a conductive gap whereby charges flow for deposition to the insulating surface. Generally it can be considered a cold discharge, and generally also, image formation occurs in the absence of other phenomenon such as thermionic emmission. Also, in forming images according to this invention, it is not intended to mean image formation through chemical or physical changes in the recording web. The specific nature of the discharge is dependent on various elements and factors such as the potentials, the field strength, the electrode materials, the fluid of the gap, whether air or other gas or liquid, the pressure and the like. For more discussion of this type of discharge, reference may be had to the aforementioned pending applications and patents and other issued patents in this art.

While the present invention, as to its objects and advantages, has been described herein as carried out in specific embodiments thereof, it is not intended to be limited thereby, but it is intended to cover the invention broadly within the spirit and scope of the appended claims.

I claim:

1. Apparatus for electrically recording signals comprising a pair of spaced apart electrical conductive structures for receiving a dielectric medium therebetween and in spaced relation to at least one of the structures, means for applying to the pair of conductive a voltage sufficient to form on the medium charge patterns corresponding to induce field discharge in the space and the configuration of the one structure and means for irradiating the space between the medium and the one structure with ultraviolet radiation whereby said field discharge is effected within a predetermined time period after application of said voltage.

2. Apparatus for electrically recording information at high speeds on a charge retentive medium as a variable pattern of dot shaped electrostatically charged areas comprising a pair of spaced apart electrically conductive structures for receiving a dielectric record medium therebetween and in spaced relation to at least one of the structures thereby defining a printing gap between said medium and said one structure, means for irradiating the printing gap with ultraviolet radiation, one of the structures including a plurality of independent energizable stationary recording electrodes and means provided for applying to the pair of conductive structures including a selected group of the recording electrodes, a voltage sufficient to induce field discharge in the gap and form on the medium charge patterns corresponding to the configuration of the selected group whereby said irradiating means is effective to precipitate said discharge within a predetermined time period after application of said voltage.

3. A device for recording electrostatic images which comprises in combination a conductive electrode, a conductive alphanumeric character face and means to support said character face in closely spaced facing relation with the surface of said electrode, means to position a dielectric record medium between said electrode and said character face and in spaced relation to at least one thereby defining a printing gap between said medium and the one, means to irradiate the printing gap with ultraviolet radiation to precipitate field discharge within a predetermined time period after applying an intense electrical field between said character face and said electrode, and means to apply an intense electric field between said character face and said electrode to produce a silent field discharge conforming in configuration to said character face to produce an alphanumeric electrostatic latent image on said medium.

4. An information printing system comprising a plurality of individual charge transferring transducers, each transducer having a stylus, said styli having a predetermined pattern of relative spatial arrangement, a backing electrode in closely spaced uniform relation to said styli, means for converting a series of input pulses in information-bearing time sequence into a set of output pulses simultaneously energizing certain of said styli, the spatial arrangement of said energized styli corresponding to the time sequence of said input pulses, means for irradiating the space between said backing electrode and said styli with ultraviolet radiation to precipitate electric discharge within a predetermined period after application of electrical pulses fed to said styli, and means for recording the pulses applied to said styli; said recording means including means for directing an electrically insulating sheet material between said styli and backing electrode with one surface of said sheet material in closely spaced relation to all said styli, whereby electrical discharge between said backing electrode and styli in accordance with the electrical pulses fed to said styli results in the formation of a charge pattern of said charge in time spaced relation on said sheet material denoting the information received by the system.

5. In apparatus for recording information at high speeds on a charge-retentive medium as a variable pattern of dot-shaped electrostatic charges, the combination of base electrode means, a plurality of independently energizable pin-type recording electrode means arranged in a cooperative opposed relation to the base electrode means and similarly spaced therefrom to define a gap therebetween into which a medium having the aforesaid characteristic may be introduced to receive such dot-shaped charges as a result of electric field discharge in the gap produced by energization of the pin electrodes, means for irradiating the space between said backing electrode and said styli with ultraviolet radiation to precipitate field discharge within a predetermined time period after energizing said electrodes, and means for selecting a group of pin electrodes and simultaneously energizing the electrodes of said selected group at a predetermined potential relative to the base electrode means to produce electric fields of recording value at positions in the gap corresponding to the energized electrodes, thereby to form different patterns of dot-shaped electrostatic charges on a medium introduced into the gap.

6. Electrostatic apparatus for the high speed recording of digital information, said apparatus comprising a rotary character drum provided with a plurality of groups of circumferentially arranged character-shaped electrodes, each group constituting a character ring, a moving insulating web disposed tangentially relative to said drum, an array of electrodes disposed above said web, each electrode being disposed to cooperate with one of said rings, means for irradiating the space between said array of electrodes and said character drum to precipitate field discharge within a predetermined time period after application of a triggering pulse to said electrodes, means to pre-stress said web to a point below critical stress, means to rotate said drum at a constant angular velocity, a character register responsive to information pulses, a character counter responsive to the successive presence of characters on said drum in the course of a rotation thereof to produce an indication thereof, a comparison circuit coupled to said register and said character counter to produce a control pulse when said information pulse and said indication of a corresponding character are coincident, a plurality of gating amplifiers connected to the respective electrodes, said amplifiers being coupled to said comparison circuit, a line matrix selector including a plurality of lines coupled to the respective gating amplifiers, and means coupled to said selector to excite successive lines one for each revolution of said drum whereby the associated gating amplifier is rendered conductive to apply a triggering pulse to the related electrode when the character indicated by the comparison circuit is positioned therebelow, said triggering pulse having an intensity effecting a field discharge.

7. A high speed electrostatic tesiprinting apparatus for recording incoming information received at random, said apparatus comprising a rotary character drum having a bank of like character rings thereon, each ring containing a series of electrically conductive character-shaped elements in a circumferential arrangement, the respective characters in the series being representative of different values of incoming information, means to rotate said drum at a constant angular velocity, an array of fixed electrodes disposed adjacent the drum defining a gap therebetween at positions corresponding to those of the ring thereopposite, means for irradiating said gap with ultraviolet radiation, to precipitate field discharge within a predetermined time period after application of a voltage pulse to said electrodes a movable web of insulating material disposed tangentially relative to said drum in said gap between said drum and said electrodes and means responsive to the value of incoming information to apply a voltage pulse to one of said electrodes when the selected ring element representative of said value is in angular alignment with said electrode to create an intense electric field between said electrode and said ring element to create a field discharge between the web and the selected ring character whereby a latent electrostatic image of the selected character is produced on the web in time spaced relation to application of said voltage pulse.

8. A high speed electrostatic tesiprinting apparatus according to claim 7 including means to apply an electrical bias to said gap, said bias being below the threshold voltage necessary to create the field discharge between said electrodes.

9. A high speed electrostatic tesiprinting apparatus according to claim 7 including means to apply an electrical bias between said array of fixed electrodes and said character rings, said bias being below the threshold voltage necessary to create the field discharge between said electrodes.

10. A high speed electrostatic tesiprinting apparatus for recording incoming information received at random, said apparatus comprising a rotary character drum having a bank of like character rings thereon, each ring containing a series of electrically conductive character-shaped elements in a circumferential arrangement, the respective characters in the series being representative of different values of incoming information, means to rotate said drum at a constant angular velocity, an array of fixed electrodes disposed adjacent the drum defining a gap therebetween at positions corresponding to those of the ring thereopposite, means for irradiating said gap with ultraviolet radiation, to precipitate field discharge within a predetermined time period after application of a voltage pulse to said electrodes a movable web of insulating material disposed tangentially relative to said drum in said gap between said drum and said electrodes, means responsive to the value of incoming information to apply sequentially the voltage pulse to said electrodes when the selected ring character representative of said value is in angular alignment with said electrode to create an intense electric field between said electrode and said ring character to create a field discharge between the web and the selected ring character whereby a latent electrostatic image of the selected character is produced on the web and means to control said sequential means to shift said pulse to the next electrode after each recording operation.

11. A high speed electrostatic tesiprinting apparatus for recording incoming information received at random, said apparatus comprising a rotary character drum having a bank of like character rings thereon, each ring containing a series of electrically conductive character-shaped elements in a circumferential arrangement, the respective characters in the series being representative of different values of incoming information, means to rotate said drum at a constant angular velocity, an array of fixed electrodes disposed adjacent the drum defining a gap therebetween at positions corresponding to those of the ring thereopposite, means for irradiating said gap with ultraviolet radiation, to precipitate field discharge within a predetermined time period after application of a voltage pulse to said electrodes a movable web of insulating material disposed tangentially relative to said drum in said gap between said drum and said electrodes, an indexing mechanism for advancing said web a line at a time, means responsive to the value of incoming information sequentially to apply a voltage pulse to said electrodes when the ring element representative of said value is in angular alignment with the selected electrode to create a field discharge between the web and the selected ring character whereby a latent electrostatic image of the selected character is produced on the web, means to control said sequential means to shift said pulse to the next electrode after each recording operation and means coupled to said indexing mechanism to actuate same upon completion of a line.

12. A high speed electrostatic tesiprinting apparatus for recording incoming information received at random, said apparatus comprising a rotary character drum having a bank of like character rings thereon, each ring containing a series of electrically conductive character-shaped elements in a circumferential arrangement, the respective characters in the series being representative of different values of incoming information, means to rotate said drum at a constant angular velocity, an array of fixed electrodes disposed above the drum defining a gap therebetween at positions corresponding to those of the ring thereopposite, means for irradiating said gap with ultraviolet radiation to precipitate field discharge between said elements and said electrodes within a predetermined time period after activating of said electrodes, a movable web of insulating material disposed tangentially relative to said drum in said gap between said drum and said electrodes, and means responsive to the value of incoming information to effect a field discharge when the ring elements representative of said value are in angular alignment with said electrodes, said field discharge occurring between said web and one of said rings corresponding to an activated fixed electrode, said electrodes being activated in sequence as said information is received.

13. A high speed electrostatic tesiprinting apparatus according to claim 12 including means to apply an electrical bias between said array of fixed electrodes and said character rings, said bias being below the threshold voltage necessary to create the field discharge between said electrodes.

References Cited in the file of this patent

UNITED STATES PATENTS

| 2,715,360 | Brown | Aug. 16, 1955 |
| 2,910,723 | Traver | Nov. 3, 1959 |
| 2,919,171 | Epstein et al. | Dec. 29, 1959 |
| 2,919,967 | Schwertz | Jan. 5, 1960 |
| 2,931,688 | Innes et al. | Apr. 5, 1960 |
| 2,976,354 | Banning et al. | Mar. 21, 1961 |

FOREIGN PATENTS

| 734,909 | Great Britain | Aug. 10, 1955 |

OTHER REFERENCES

Loeb: "Basic Processes of Gaseous Electronics"; University of California Press, 1960, QC 711 L6b 1960 in Scientific Library; pp. 3, 4, 795–798, 887 and 927 cited.

UNITED STATES PATENT OFFICE
CERTIFICATE OF CORRECTION

Patent No. 3,068,481                                December 11, 1962

Frederick A. Schwertz

It is hereby certified that error appears in the above numbered patent requiring correction and that the said Letters Patent should read as corrected below.

Column 1, line 47, for "reliatively" read -- relatively --; column 2, line 26, for "single" read -- spindle --; column 4, line 10, for "count" read -- counter --; column 5, line 66, for "compelte" read -- complete --; column 6, line 36, for "second's" read -- seconds' --; column 6, line 48, for "stay" read -- stays --; line 70, for "cyclically" read -- cyclicly --; column 7, line 7, for "As" read -- At --; column 9, line 9, for "emmission" read -- emission --; line 18, for "aforementionad" read -- aforementioned --; line 31, after "conductive" insert -- structures --; line 33, strike out "induce field discharge in the space and" and insert the same after "to" in line 32, same column 9; column 10, line 21, strike out "of said charge"; column 11, lines 15 and 53, and column 12, line 8, after "radiation", each occurrence, strike out the comma; column 11, lines 17 and 55, and column 12, line 10, after "electrodes", each occurrence, insert a comma; column 11, line 28, before "application" insert -- the --.

Signed and sealed this 12th day of May 1964.

(SEAL)
Attest:

ERNEST W. SWIDER                                        EDWARD J. BRENNER

Attest Officer                                             Commissioner of Patents